US010211672B2

(12) United States Patent
Mouridsen

(10) Patent No.: US 10,211,672 B2
(45) Date of Patent: Feb. 19, 2019

(54) DC-LINK BUS BALANCER

(71) Applicant: SCHNEIDER ELECTRIC IT CORPORATION, West Kingston, RI (US)

(72) Inventor: Jonas Sonsby Mouridsen, Odense V (DK)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 149 days.

(21) Appl. No.: 15/292,461

(22) Filed: Oct. 13, 2016

(65) Prior Publication Data

US 2018/0109136 A1 Apr. 19, 2018

(51) Int. Cl.
| H02J 9/06 | (2006.01) |
| H02M 5/458 | (2006.01) |
| H02M 7/487 | (2007.01) |
| H02M 7/5395 | (2006.01) |

(52) U.S. Cl.
CPC .......... *H02J 9/062* (2013.01); *H02M 5/4585* (2013.01); *H02M 7/487* (2013.01); *H02M 7/5395* (2013.01); *H02J 2009/063* (2013.01)

(58) Field of Classification Search
CPC .................................................. H02M 7/487
See application file for complete search history.

(56) References Cited

U.S. PATENT DOCUMENTS

| 5,517,401 A * | 5/1996 | Kinoshita ........... B60L 11/1803 363/132 |
| 5,627,742 A * | 5/1997 | Nakata ..................... B60L 9/22 323/235 |
| 5,910,892 A * | 6/1999 | Lyons ................... H02M 7/487 363/132 |

(Continued)

FOREIGN PATENT DOCUMENTS

| EP | 3024132 A2 | 5/2016 |
| WO | 2015131781 A1 | 9/2015 |
| WO | 2015199718 A1 | 12/2015 |

OTHER PUBLICATIONS

"3L NPC & TNPC Topology", Oct. 12, 2015, Semikron.*

(Continued)

*Primary Examiner* — Rexford Barnie
*Assistant Examiner* — David Shiao
(74) *Attorney, Agent, or Firm* — Lando & Anastasi, LLP

(57) ABSTRACT

According to one aspect, embodiments of the invention provide a UPS comprising a plurality of DC busses configured to receive DC power from a converter, the plurality of DC busses including a positive DC bus configured to maintain a positive DC voltage level, a mid-point DC bus, and a negative DC bus configured to maintain a negative DC voltage level, a 3-level inverter coupled to the plurality of DC busses and configured to convert the DC power from the plurality of DC buses into output AC power, and a controller configured to monitor the positive and negative DC voltage levels, identify an imbalance between the positive and (Continued)

negative DC voltage levels, and selectively control, based on the imbalance, the 3-level inverter to operate in a 2-level mode of operation and a 3-level mode of operation to transfer energy between the positive and negative DC busses.

20 Claims, 10 Drawing Sheets

(56) References Cited

U.S. PATENT DOCUMENTS

| | | | | |
|---|---|---|---|---|
| 6,842,354 B1* | 1/2005 | Tallam | ............... | H02M 7/487 363/132 |
| 9,595,876 B2 | 3/2017 | Nielsen | | |
| 2006/0245216 A1* | 11/2006 | Wu | ............... | H02M 7/487 363/13 |
| 2011/0109285 A1* | 5/2011 | El-Barbari | ............... | H02M 7/487 323/282 |
| 2011/0116293 A1* | 5/2011 | Tabata | ............... | H02M 7/487 363/132 |
| 2011/0134672 A1* | 6/2011 | Sato | ............... | H02M 1/10 363/126 |
| 2011/0141786 A1* | 6/2011 | Shen | ............... | H02M 7/487 363/131 |
| 2012/0287690 A1* | 11/2012 | Paatero | ............... | H02M 7/487 363/134 |
| 2013/0163292 A1* | 6/2013 | Basic | ............... | H02M 5/4585 363/34 |
| 2013/0163301 A1* | 6/2013 | Fujii | ............... | H02M 7/487 363/97 |
| 2014/0036555 A1* | 2/2014 | Kolhatkar | ............... | H02M 7/487 363/56.01 |
| 2014/0233290 A1* | 8/2014 | Spanos | ............... | H02M 7/5387 363/131 |
| 2016/0006295 A1 | 1/2016 | Yang et al. | | |
| 2017/0077749 A1* | 3/2017 | Xu | ............... | H02J 9/062 |

OTHER PUBLICATIONS

P. Barbosa, P. Steimer, L. Meysenc, M. Winkelnkemper, J. Steinke, N. Celanovic, "Active neutral-point-clamped multilevel converters", Jun. 16, 2005, IEEE, IEEE 36th Power Electronics Specialists Conference, 2005.*

Extended European Search Report from corresponding European Application No. 17195374.8 dated Feb. 21, 2018.

He, J. et al: "Diagnosis of open-circuit switch faults in multilevel active-NPC (ANPC) inverters", Jun. 15, 2014 (Jun. 15, 2014), 2014 IEEE Transportation Electrification Conference and Expo (ITEC), IEEE, p. (S) 1-6, XP032778630, [retrieved on Jul. 21, 2014].

Lin, B.R. et al:, "Implementati on of the AC/AC converter based on neutral-point switch-clamped topology", IEE Proceedings: Electric Power Applicati, Institution of Electrical Engineers, GB, vol. 150, No. 4, Apr. 10, 2003 (Apr. 10, 2003), pp. 455-463, XP006020459, ISSN: 1350-2352, DOI: 10.1049/IP-EPA:20020755.

Rasmussen, Neil, "The Role of Isolation Transformers in Data Center UPS Systems," White Paper #98, Revision 0, 2011. Schneider Electric—Data Center Science Center, pp. 1-26.

* cited by examiner

DC-LINK BUS BALANCER

BACKGROUND OF THE INVENTION

1. Field of Invention

The present invention relates generally to systems and methods for controlling an uninterruptible power supply (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

At least one aspect of the invention is directed to an Uninterruptible Power Supply (UPS) system, the UPS system comprising an input configured to be coupled to an AC source and to receive input AC power from the AC source, an output configured to provide output AC power to a load, a converter coupled to the input and configured to convert the input power into DC power having a positive DC voltage level and a negative DC voltage level, a plurality of DC busses coupled to the converter and configured to receive the DC power from the converter, the plurality of DC busses including a positive DC bus configured to maintain the positive DC voltage level, a mid-point DC bus, and a negative DC bus configured to maintain the negative DC voltage, a 3-level inverter coupled to the plurality of DC busses and configured to convert the DC power from the plurality of DC buses into the output AC power and provide the output AC power to the output, and a controller configured to monitor the positive DC voltage level and the negative DC voltage level, identify an imbalance between the positive DC voltage level and the negative DC voltage level, and selectively control, based on the imbalance, the 3-level inverter to operate in a 2-level mode of operation and a 3-level mode of operation to transfer energy between the positive DC bus and the negative DC bus. In one embodiment, the 3-level inverter is based on an NPC-2 topology.

According to one embodiment, in selectively controlling the 3-level inverter to operate in the 2-level mode of operation and the 3-level mode of operation, the controller is further configured to operate the 3-level inverter, during a positive half-period of a line cycle, in the 2-level mode of operation to transfer energy from the positive DC bus to the negative DC bus. According to another embodiment, in operating the 3-level inverter, during the positive half-period of the line cycle, in the 2-level mode of operation to transfer energy from the positive DC bus to the negative DC bus, the controller is further configured to operate the 3-level inverter in the 2-level mode of operation for a portion of the positive half-period. In one embodiment, in operating the 3-level inverter, during the positive half-period of the line cycle, in the 2-level mode of operation to transfer energy from the positive DC bus to the negative DC bus, the controller is further configured to operate the 3-level inverter to alternate between the 2-level mode of operation and the 3-level mode of operation during the positive half-period. In another embodiment, in operating the 3-level inverter, during the positive half-period of the line cycle, in the 2-level mode of operation to transfer energy from the positive DC bus to the negative DC bus, the controller is further configured to operate the 3-level inverter in the 2-level mode of operation for the entire positive half-period. In one embodiment, in selectively controlling the 3-level inverter to operate in the 2-level mode of operation and the 3-level mode of operation, the controller is further configured to operate the 3-level inverter, during a negative half-period of the line cycle, in the 2-level mode of operation to transfer energy from the negative DC bus to the positive DC bus.

According to one embodiment, the 3-level inverter comprises a plurality of switches coupled between the plurality of DC busses, and wherein in selectively controlling the 3-level inverter to operate in the 2-level mode of operation and the 3-level mode of operation, the controller is further configured to control the plurality of switches to operate, in a first mode of operation, to generate a first current path that draws energy from the positive DC bus and boosts current through the output, operate, in a second mode of operation, to generate a second current path between the mid-point DC bus and the output, and operate, in a third mode of operation, to generate a third current path that delivers energy to the negative DC bus 110.

According to another embodiment, the plurality of switches includes a first switch coupled between the positive DC bus and the output, a second switch coupled between the negative DC bus and the output, a third switch coupled to mid-point DC bus, and a fourth switch coupled between the third switch and the output. In one embodiment, in operating the plurality of switches in the first mode of operation, the controller is further configured to control the first switch to close to couple the positive DC bus to the output via the first switch. In another embodiment, the UPS system further comprises a first capacitor coupled between the mid-point bus and the positive DC bus. In one embodiment, in operating the plurality of switches in the second mode of operation, the controller is further configured to control the third switch and the fourth switch to close to couple the mid-point DC bus to the output via the third switch and the fourth switch. In another embodiment, in operating the plurality of switches in the third mode of operation, the controller is further configured to control the second switch to couple the negative DC bus to the output via the second switch. In one embodiment, the UPS system further comprises a second capacitor coupled between the mid-point bus and the negative DC bus.

According to one embodiment, the converter is further configured to receive 3-phase input AC power from the AC source and convert the 3-phase input AC power into the DC power. In one embodiment, the 3-level inverter if further configured to convert the DC power from the plurality of DC buses into 3-phase output AC power and provide the 3-phase AC power to the output.

Another aspect of the invention is directed to a method for operating a UPS comprising an input configured to be coupled to a power source, an output, a plurality of DC buses including a positive DC bus, a mid-point DC bus, and a negative DC bus, and a 3-level inverter coupled to the plurality of DC busses, the method comprising receiving input power from the power source, maintaining a positive DC voltage level on the positive DC bus, maintaining a negative DC voltage level on the negative DC bus, converting, with the 3-level inverter, the DC power from the plurality of DC buses into output AC power, providing the output AC power to the output, monitoring the positive DC voltage level and the negative DC voltage level, identifying an imbalance between the positive DC voltage level and the negative DC voltage level, and selectively controlling, based on the imbalance, the 3-level inverter to operate in a 2-level mode of operation and a 3-level mode of operation to transfer energy between the positive DC bus and the negative DC bus.

According to one embodiment, selectively controlling the 3-level inverter to operate in the 2-level mode of operation and the 3-level mode of operation includes operating the 3-level inverter, during a positive half-period of a line cycle, in the 2-level mode of operation to transfer energy from the positive DC bus to the negative DC bus, and operating the 3-level inverter, during a negative half-period of the line cycle, in the 2-level mode of operation to transfer energy from the negative DC bus to the positive DC bus. In another embodiment, the UPS further comprises a plurality of switches coupled between the DC busses, and wherein operating the 3-level inverter, during the positive half-period of the line cycle, in the 2-level mode of operation to transfer energy from the positive DC bus to the negative DC bus includes operating, in a first mode of operation, the plurality of switches to boost output current of the 3-level inverter, operating, in a second mode of operation, the plurality of switches to free-wheel current in the mid-point DC bus, and operating, in a third mode of operation, the plurality of switches to free-wheel current in the negative DC bus, transferring energy from the positive DC bus to the negative DC bus.

At least one aspect of the invention is directed to an Uninterruptible Power Supply (UPS) system, the UPS system comprising an input configured to be coupled to a power source and to receive input power from the power source, an output configured to provide output AC power to a load, a converter coupled to the input and configured to convert the input power into DC power having a positive DC voltage level and a negative DC voltage level, a plurality of DC busses coupled to the converter and configured to receive the DC power from the converter, the plurality of DC busses including a positive DC bus configured to maintain the positive DC voltage level, a mid-point DC bus, and a negative DC bus configured to maintain the negative DC voltage level, and means for converting the DC power from the plurality of DC buses into the output AC power, for providing the output AC Power to the output, and for balancing the positive DC voltage level on the positive DC bus with the negative DC voltage level on the negative DC bus.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
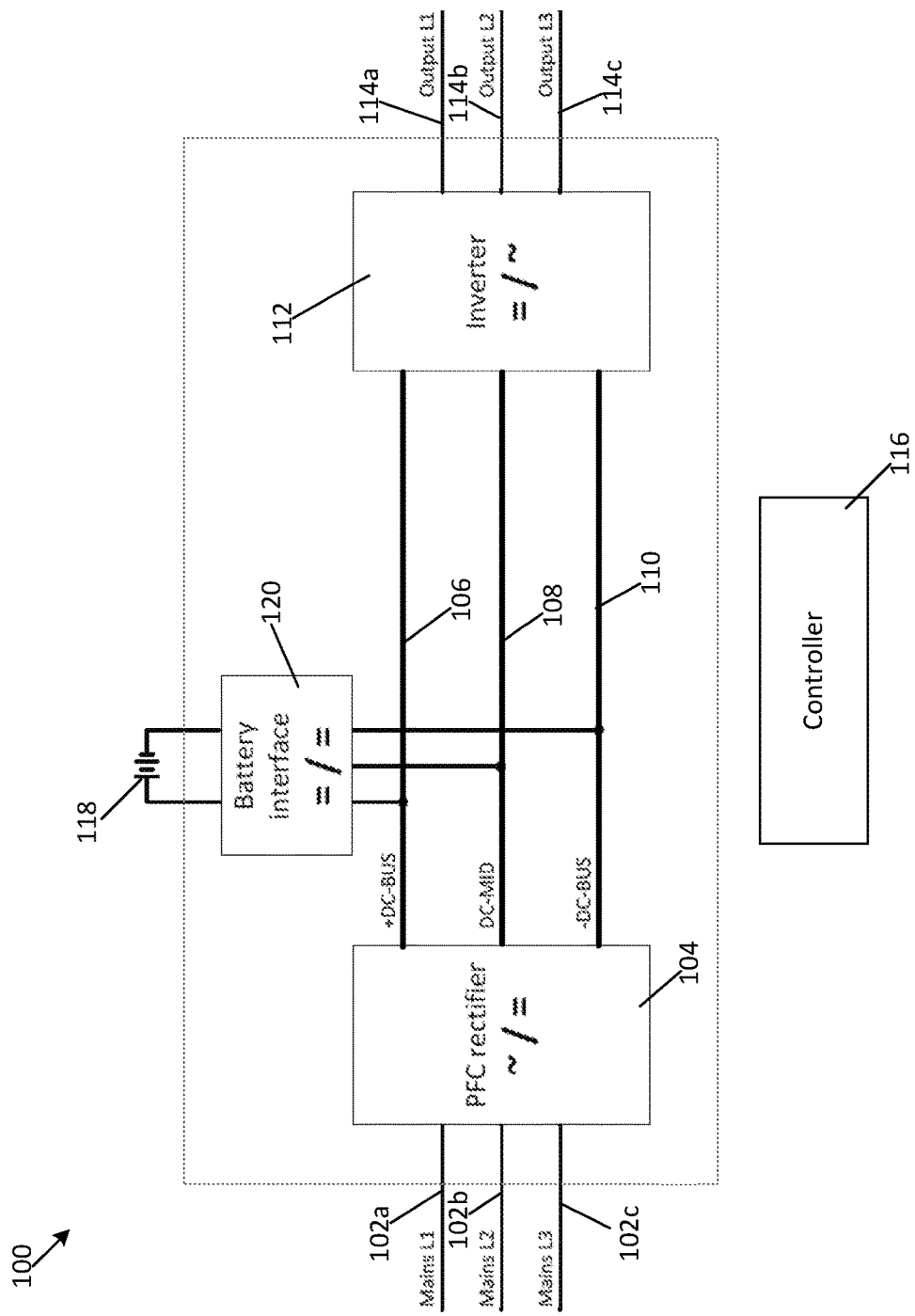
FIG. 1 is a block diagram of an online UPS according to aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS) are oftentimes used to provide regulated, uninterrupted power to sensitive and/or critical loads. A conventional online UPS rectifies input AC power provided by an electric utility using a Power Factor Correction circuit (PFC) to provide DC power to a DC bus. The rectified DC power on the DC Bus is typically used to charge a battery while mains power is available. In the absence of mains power, the battery discharges and provides DC power to the DC bus. From the DC power on the DC bus, an inverter generates an AC output voltage that is provided to a load. Since the DC bus is powered either by mains or the battery, the output power of the UPS is uninterrupted if the mains fails and the battery is sufficiently charged. Typical online UPS's may also operate in a bypass mode where unconditioned power with basic protection is provided directly from an AC power source to a load via a bypass line.

Some online UPS systems are three-phase systems that receive three-phase input AC power and output 3-phase output power. Such systems typically include three input lines (i.e., one for each input phase) and three output lines (i.e., one for each output phase). A large number of conventional 3-phase online UPS systems are based on 3-level topologies and thus are able to switch between three voltage levels: a positive DC-bus, a mid-point, and a negative DC-bus. The mid-point is typically connected to a neutral line.

A half-wave rectified load powered by a 3-level online UPS system is typically connected between one of the output phase lines of the UPS and the neutral line. As such, the load only draws power over one half-period of a switching cycle of the inverter. For example, if power is only drawn by the load over a positive half-period of an inverter switching cycle, the inverter of the UPS system will draw more power from the positive DC-bus compared to the negative DC-bus. In such a situation, the PFC circuit (e.g., rectifier) of the UPS must deliver more power during the positive half-period of the inverter switching cycle to keep the DC-bus voltages in balance. This is generally not a problem as long as a neutral line, connected to the input, the mid-point, and the output, is present. More specifically, the PFC circuit can draw more power during the positive half period of the inverter switching cycle, resulting in a current flow in the neutral line which is proportional to the load unbalance.

However, in situations where a neutral line is not present or unwanted at the input of the system, the PFC circuit will not be able to draw asymmetrical power since the input power will only be loaded phase-to-phase, effectively canceling any unbalance (i.e., the virtual midpoint between phases will shift in the case of unbalance). A common technique to account for this constraint is to install a delta-wye isolation transformer on the input or output of the system to create a new neutral midpoint. However, this is a relatively expensive and bulky solution which also may compromise the overall efficiency of the system.

Another situation where an unbalanced load may pose a problem is in battery operation, where a load is temporarily powered by a battery of the UPS system. If the battery only consists of a single string, the battery will only be able to deliver an equal amount of power to both the positive DC-bus and the negative DC-bus. One solution to this, enabling asymmetric power distribution to the DC-busses, is to utilize a split-battery where the mid-point of a battery bank is connected to neutral. However, many UPS systems only support single string batteries and single string batteries are commonly preferred over split-batteries.

Accordingly, if true three-wire mains operation (i.e., without mains neutral) and/or single-string battery support is required/preferred, a dedicated solution for the balancing of the DC-busses must typically be incorporated. For example, many UPS systems contain an additional converter utilized specifically for the balancing of the positive and negative bus voltages. Such a converter (i.e., bus balancer) is commonly designed to transfer a limited amount of power (e.g., 10% of specified maximum output power) from one DC-bus to the other. Such dedicated bus balancer circuits not only increase the overall cost of the UPS system, but also take up valuable space in the UPS system.

In at least one embodiment, a UPS system is provided that utilizes the inverter of the UPS as a DC bus balancer, thus saving the additional cost and footprint typically required by a dedicated bus balancer circuit. The UPS system operates by controlling the 3-level inverter to operate as a 2-level inverter during at least a part of a high-frequency inverter switching cycle in one half-period of an AC line cycle.

FIG. 1 is a block diagram of an online UPS 100 according to one aspect of the present invention. The UPS 100 includes a first input phase line 102*a*, a second input phase line 102*b*, a third input phase line 102*c*, a PFC rectifier 104, a positive DC-bus 106, a mid-point bus 108, a negative DC-bus 110, an inverter 112, a first output phase line 114*a*, a second output phase line 114*b*, a third output phase line 114*c*, and a controller 116. In at least one embodiment, the UPS 100 also includes a battery 118 and a battery interface 120. The inverter 112 is a three level inverter. For example, in one embodiment, the inverter 112 is configured based on an NPC (Neutral Point Clamped)-2 topology. However, in other embodiments, the inverter 112 is configured based on another appropriate 3-level inverter topology (e.g., NPC-1 topology).

Each input phase lines 102*a-c* is configured to be coupled to one phase of a three phase power source and is coupled to the PFC rectifier 104. The PFC rectifier 104 is coupled to the inverter 112 via the positive DC bus 106, the mid-point bus 108, and the negative DC-bus 110. The inverter 112 is also configured to be coupled to a load via at least one of the first output phase line 114*a*, the second output phase line 114*b*, and the third output phase line 114*c*. According to one embodiment, the battery 118 is also coupled to the positive DC bus 106, the mid-point DC bus 108, and the negative DC-bus 110 via the battery interface 120. In one embodiment, the battery interface 120 is a bidirectional DC-DC converter. The controller 116 is coupled to the PFC rectifier 104, the battery interface 120, and the inverter 112 and is configured to provide control signals to the PFC rectifier 104, the battery interface 120, and the inverter 112.

The controller 116 monitors the input AC power received by the input phase lines 102*a-c* and is configured to operate the UPS 100 in different modes of operation based on the status of the input AC power received by the input phase lines 102*a-c*. When AC power provided to the input phase lines 102*a-c* is acceptable (i.e., above an input power threshold), the controller 116 operates the UPS 100 in a normal mode of operation. In the normal mode of operation, AC power from the input phase lines 102*a-c* is provided to the PFC rectifier 104. The controller 116 operates the PFC rectifier 104 to convert the input AC power into DC power and provide the converted DC power to the positive DC bus 106 and the negative DC bus 110. The controller 116 also operates the PFC rectifier 104 to provide PFC at the input phase lines 102*a-c*.

In the normal mode of operation, the inverter 112 receives DC power from the positive and negative DC busses 106, 110 and operates over high-frequency switching cycles to convert the DC power into regulated AC power, and provides the regulated AC power to a load coupled to at least one of the output phase lines 114*a-c*. In the normal mode of operation, DC power may also be provided from the positive and negative DC busses 106, 110 to the battery interface 120 and the controller 116 operates the battery interface 120 to convert the DC power from the DC busses 106, 110 into DC power at a desired level. The DC power from the battery interface 120 is provided to the battery 118 to charge the battery.

When AC power provided to the input phase lines 102a-c is not acceptable (i.e., below an input power threshold), the controller 116 operates the UPS 100 in a backup mode of operation. In the backup mode of operation, DC power from the battery 118 is regulated by the battery interface 120 and provided to the positive and negative DC busses 106, 110. The inverter 112 receives the DC power from the DC busses 106, 110 and operates over high-frequency switching cycles to convert the DC power into regulated AC power, and provides the regulated AC power to a load coupled to at least one of the output phase lines 114a-c.

In both the normal and backup modes of operation, while operating the inverter 112 over high-frequency switching cycles to convert the DC power from the DC busses 106, 110 into regulated AC power to provide to the load, the controller 116 also operates the inverter 112 to balance the voltages on the positive and negative DC busses 106, 108. The controller 116 operates the 3-level inverter 112 to operate at least partially as a 2-level inverter during one half-period of an AC line cycle, thus delivering energy to the opposite DC-bus during the time it is operated as a 2-level inverter. Operation of the inverter 112 is discussed in greater detail below.

Figure 2:
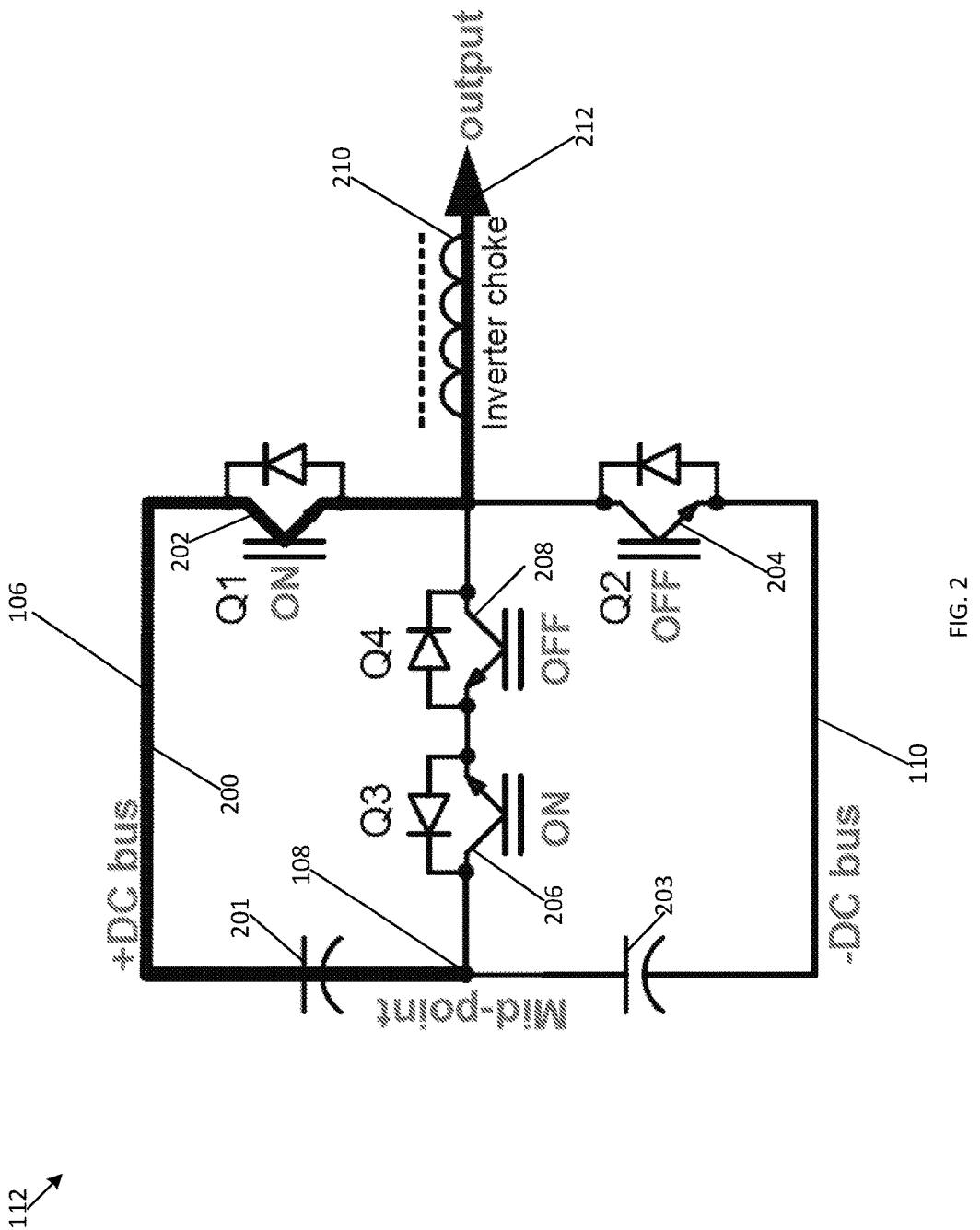
FIG. 2 illustrates a first mode of operation of an inverter according to aspects described herein.
Figure 3:
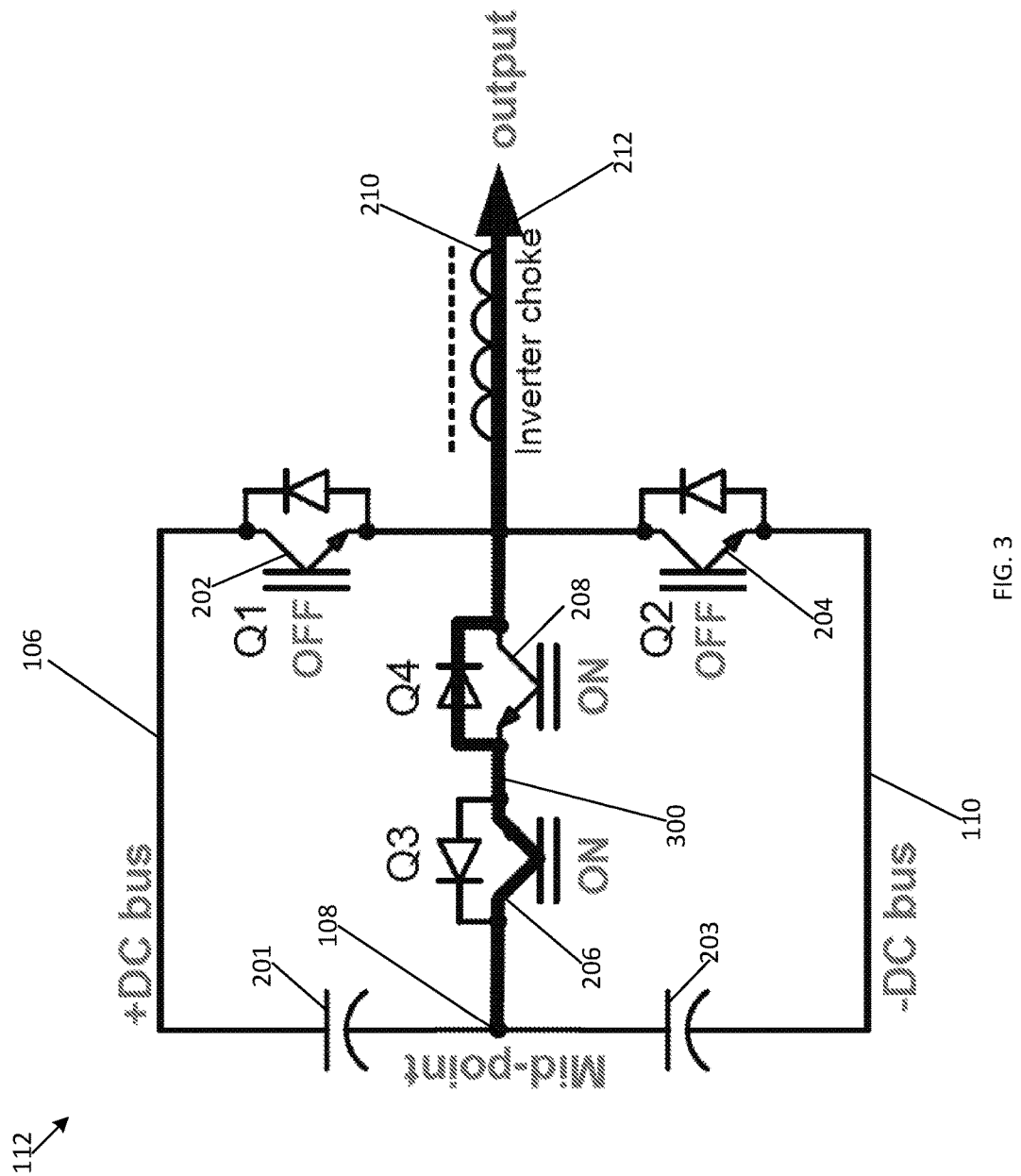
FIG. 3 illustrates a second mode of operation of an inverter according to aspects described herein.
Figure 4:
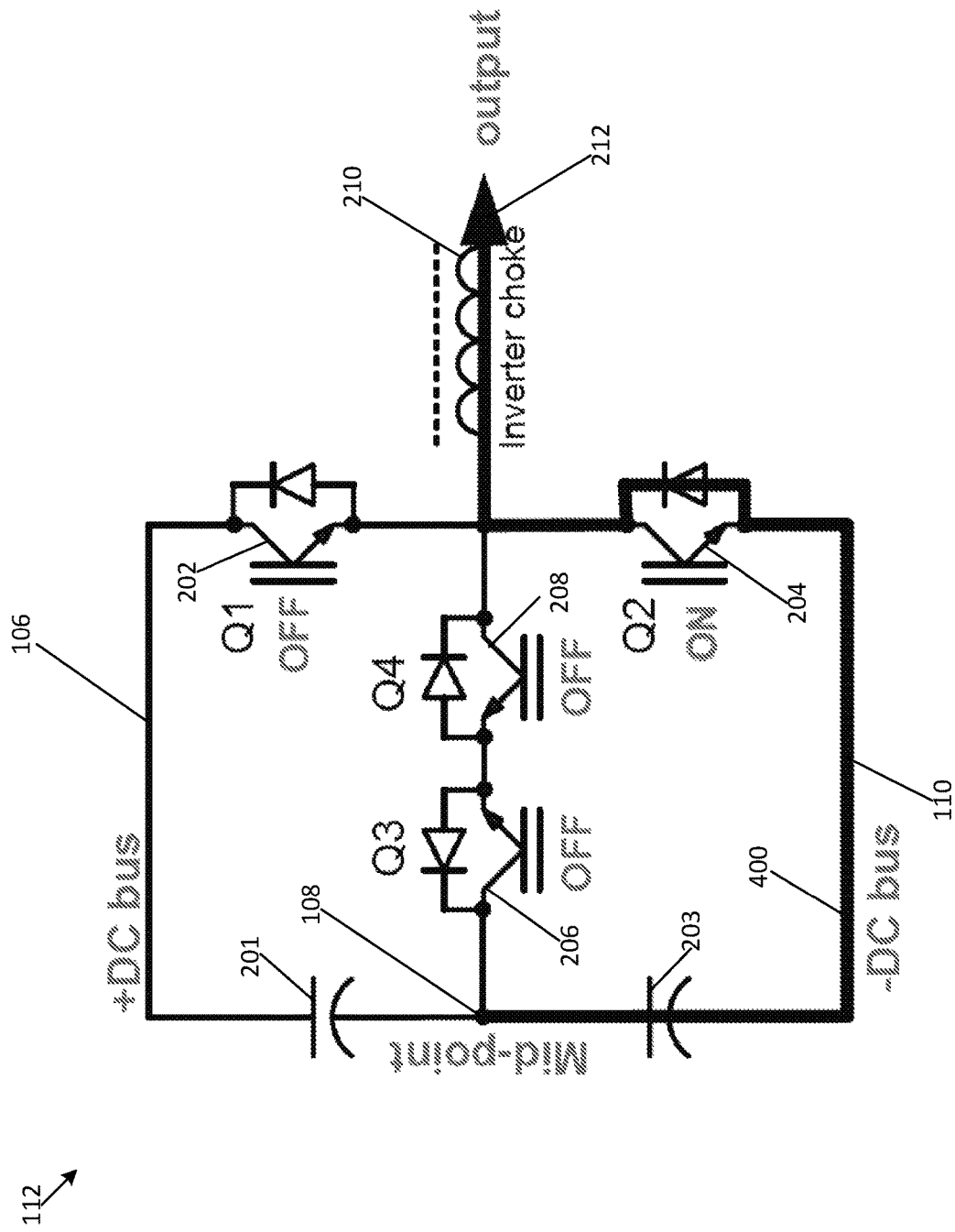
FIG. 4 illustrates a third mode of operation of an inverter according to aspects described herein.

FIGS. 2-4 are more detailed schematic diagrams illustrating operation of the inverter 112 during a positive half-period of an AC line cycle (i.e., 50 Hz/60 Hz). As shown in FIGS. 2-4, the inverter 112 includes a plurality of switches including a first switch (Q1) 202, a second switch (Q2) 204, a third switch (Q3) 206, and a fourth switch (Q4) 208. The inverter 112 also includes an output inductor 210 and an output 212. In one embodiment, each of the plurality of switches 202, 204, 206, 208 is an Insulated Gate Bipolar Transistor (IGBT); however, in other embodiments, each switch 202, 204, 206, 208 can be another appropriate type of switch and/or transistor (e.g., a Metal-Oxide-Semiconductor Field-Effect Transistor (MOSFET)). According to at least one embodiment, each switch 202, 204, 206, 208 includes a diode connected in anti-parallel to the switch. In at least on embodiment, the diode is the intrinsic body-diode of a MOSFET or a co-pack diode of an IGBT.

According to at least one embodiment shown in FIGS. 2-4, the drain of the first switch (Q1) 202 is coupled to the positive DC-bus 106 and the emitter of the first switch (Q1) 202 is coupled to a first end of the inductor 210. The drain of the second switch (Q2) 204 is coupled to the first end of the inductor 210 and the emitter of the second switch (Q2) 204 is coupled to the negative DC-bus 110. The drain of the third switch (Q3) 206 is coupled to the mid-point bus 108 and the emitter of the third switch (Q3) 206 is coupled to the emitter of the fourth switch (Q4) 208. The drain of the fourth switch (Q4) 208 is coupled to the first end of the inductor 210. The second end of the inductor 210 is coupled to the output 212. The mid-point bus 108 is coupled to the positive DC bus 106 via a first capacitor 201 and is coupled to the negative DC bus 110 via a second capacitor 203. The controller 116 is coupled to the gate of each switch 202, 204, 206, 208 and is configured to provide control signals to the gate of each switch 202, 204, 206, 208.

FIG. 2 illustrates a first mode of operation of the inverter 112 during a high-frequency switching cycle in the positive half-period of a line cycle where the output current of the inverter (i.e., the current through the output 212) is boosted. In the first mode of operation, the controller 116 operates the first switch (Q1) 202 to close, the second switch (Q2) 204 to open, the third switch (Q3) 206 to close, and the fourth switch (Q4) to open. Once the first switch (Q1) 202 is closed, the second switch (Q2) 204 is opened, the third switch (Q3) 206 is closed, and the fourth switch (Q4) is opened, a first current path 200 is formed including the mid-point bus 108, the first capacitor 201, the positive DC bus 106, the first switch (Q1) 202, the inductor 210, and the output 212. During the first mode of operation, the first current path 200 draws energy from the positive DC bus 106 and boosts current through the output 212.

FIG. 3 illustrates a second mode of operation of the inverter 112 during a high-frequency switching cycle in the positive half-period of the line cycle where current is free-wheeling in the mid-point DC bus 108. In the second mode of operation, the controller 116 operates the first switch (Q1) 202 to open, the second switch (Q2) 204 to open, the third switch (Q3) 206 to close, and the fourth switch (Q4) to close. Once the first switch (Q1) 202 is opened, the second switch (Q2) 204 is opened, the third switch (Q3) 206 is closed, and the fourth switch (Q4) is closed, a second current path 300 is formed including the mid-point bus 108, the third switch (Q3) 206, the fourth switch (Q4) 208, the inductor 210, and the output 212. During the second mode of operation, current free-wheels through the inverter 112 via the second current path 300.

FIG. 4 illustrates a third mode of operation of the inverter 112 during a high-frequency switching cycle in the positive half-period of the line cycle where current is free-wheeling in the negative DC bus 110. In the third mode of operation, the controller 116 operates the first switch (Q1) 202 to open, the second switch (Q2) to close, the third switch (Q3) 206 to open, and the fourth switch (Q4) to open. Once the first switch (Q1) 202 is opened, the second switch (Q2) 204 is closed, the third switch (Q3) is opened, and the fourth switch (Q4) is opened, a third current path 400 is formed including the mid-point bus 108, the second capacitor 203, the negative DC bus 110, a diode of the second switch (Q2) 204, the inductor 210, and the output 212. During the third mode of operation, assuming that the inverter is operating in the positive half-period and the output current is positive (i.e., inverter operating in the $1^{st}$ quadrant), current free-wheels through the inverter 112 via the third current path 400 and the third current path 400 delivers energy to the negative DC bus 110.

By operating the inverter 112 in the first, second, and/or third modes during the positive half-period, the controller 116 operates the inverter 112 to not only provide desired output power to the output 212 but also to balance the voltages on positive and negative DC busses 106, 110. For example, the controller 116 monitors the output power of the inverter 112 and operates the inverter 112 in the first mode of operation to regulate the power (derived from the positive DC bus 106) provided to the output lines 114a-c. The controller 116 also monitors a voltage level of the positive DC bus 106 and a voltage level of the negative DC bus 110 and operates the inverter 112 to alternate between the second and third modes of operation to balance the voltage level of the positive DC bus 106 with the voltage level of the negative DC bus 110.

More specifically, according to one embodiment, the controller 116 monitors the voltage level of the positive DC bus 106 and the voltage level of the negative DC bus 110 and determines whether the voltages on the positive DC bus 106 and the negative DC bus 110 are unbalanced. In response to determining that the voltages on the positive DC bus 106 and the negative DC bus 110 are balanced, the controller 116 operates the inverter 112 in the second mode of operation. In response to determining that the voltages on the positive DC bus 106 and the negative DC bus 110 are unbalanced and that energy needs to be transferred from the positive DC bus 106 to the negative DC bus 110 to balance the voltages on the DC busses 106, 110, the controller 116 operates the inverter 112 partially in the third mode of operation during the positive half-period to transfer energy from the positive DC bus 106 to the negative DC bus 110 (i.e., to balance the voltage on the negative DC bus 110 with the voltage on the positive DC bus 106).

Alternating between the second mode of operation and the third mode of operation is done by turning on or off the mid-point switches (i.e., the third switch (Q3) 206 and the fourth switch (Q4) 208). More specifically, if no energy transfer is required between the positive DC bus 106 and the negative DC bus 110, the controller 116 operates the inverter 112 in the second mode of operation such that current free-wheels through the mid-point DC bus 108. If energy transfer between the positive DC bus 106 and the negative DC bus 110 is required, the controller 116 operates the inverter 112 in the third mode of operation such that current free wheels through the negative DC bus 110 and the diode of the second switch (Q2) 204 for at least a part of the positive half-period. If the inverter 112 is operated partially in the third mode of operation during the positive half-period of an AC line cycle to transfer energy from the positive DC bus 106 to the negative DC bus 110; in the opposite (i.e., negative) half-period of the AC line cycle, the controller 116 operates the inverter 112 as a 3-level inverter to draw power to the output from the negative DC bus 110 only via the second switch (Q2) (similar to the first mode of operation) or the mid-point switches (i.e., the third switch (Q3) 206 and the fourth switch (Q4) 208).

The controller 116 can also operate the inverter 112 in different modes of operation during the negative half-period of an AC line cycle to not only provide desired output power to the output 212 but also to balance the voltages on positive and negative DC busses 106, 110. For example, during the negative half-period, the controller 116 can operate the inverter 112 to draw energy from the negative DC bus 110 to boost output current of the inverter 112 (e.g., similar to the first mode of operation described above). The controller can also operate the inverter 112 such that current free-wheels in the mid-point DC bus 108 when the transfer of energy from the negative DC bus 110 to the positive DC bus 106 is not required (e.g., similar to the second mode of operation described above), and, assuming that the inverter is operating in the negative half-period and the output current is negative (i.e., inverter operating in the $3^{rd}$ quadrant), such that current free-wheels in the positive DC bus 106 to deliver energy to the positive DC bus 106 when the transfer of energy from the negative DC bus 110 to the positive DC bus 106 is required to balance the voltages on the positive and negative DC busses 106, 110.

By alternating between 2-level operation (e.g., the third mode of operation described above) and 3-level operation (e.g., the second mode of operation described above), the controller 116 can balance the voltages between the positive and negative DC busses 106, 110. There are multiple different control schemes for alternating between 2-level and 3-level operation.

Figure 5:
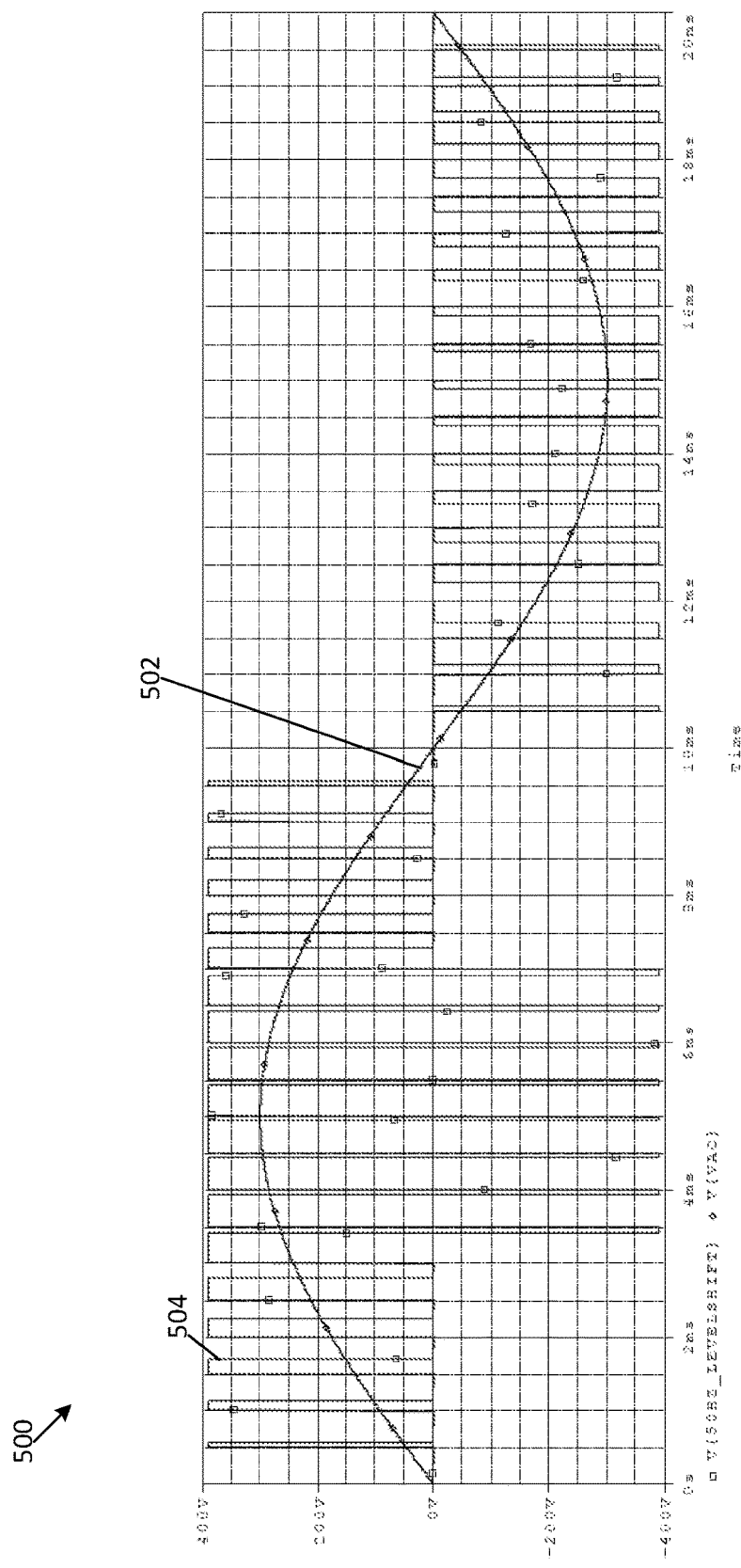
FIG. 5 is a graph illustrating a control scheme of an inverter according to aspects described herein.

FIG. 5 is a graph 500 illustrating a control scheme of the inverter 112 according to at least one embodiment. The graph 500 includes a first trace 502 illustrating an output AC voltage waveform (VAC) of the inverter 112, and a second trace 504 illustrating a high frequency (e.g., 20 kHz) Pulse Width Modulation (PWM) voltage of the inverter 112. During the control scheme illustrated in FIG. 5, the controller 116 operates the inverter 112 to operate as purely a 2-level converter in only a portion (e.g., from 3 ms to 7 ms) of each positive half-period (e.g., 50 Hz half period). During this time, current free-wheels through the negative DC bus 110 to transfer energy from the positive DC bus 106 to the negative DC bus 110 and thus balance the voltage on the positive DC bus 106 and the negative DC bus 110.

Figure 6:
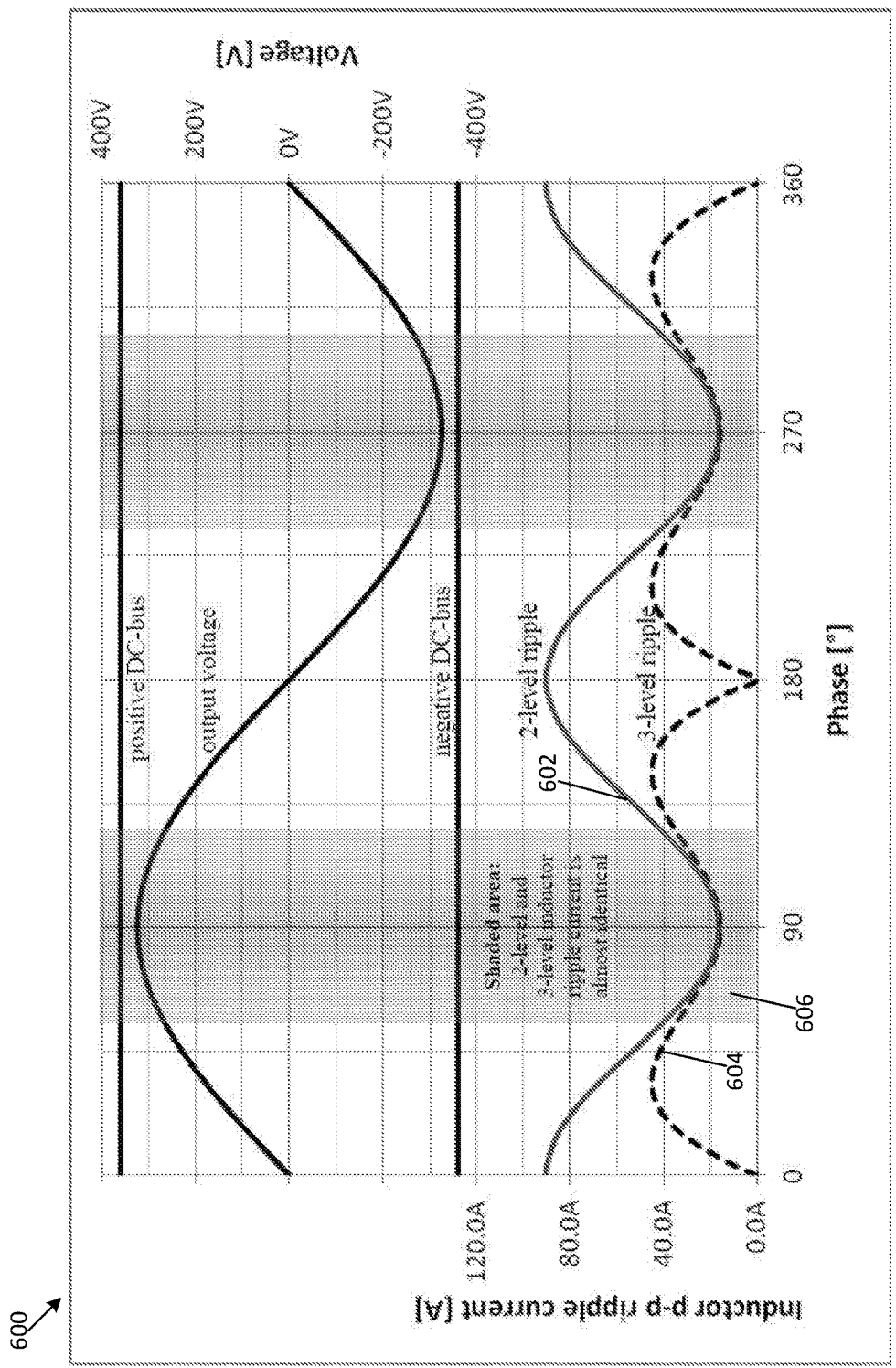
FIG. 6 includes a graph illustrating operation of an inverter according to aspects described herein.

Operation of the inverter 112 per the control scheme illustrated in FIG. 5 may exhibit several benefits. For example, as the 2-level operation of the inverter 112 is distributed evenly in each half-period, the regulation speed/bandwidth will be relatively high. In addition, if the 2-level operation is centered around the top-point of a half period of the corresponding output waveform 502 (e.g., at 5 ms shown in FIG. 5), the inductor ripple current may be almost unaffected. For example, as shown in FIG. 6 (including a graph 600 illustrating operation of the inverter 112 in 2-level and 3-level operation), inductor ripple current for 3-level operation 604 is almost identical to the inductor ripple current for 2-level operation 602 in the shaded areas 606. As such, if the 2-level operation is centered around the top-point of a half period, core losses and output ripple will substantially not be affected.

Figure 7:
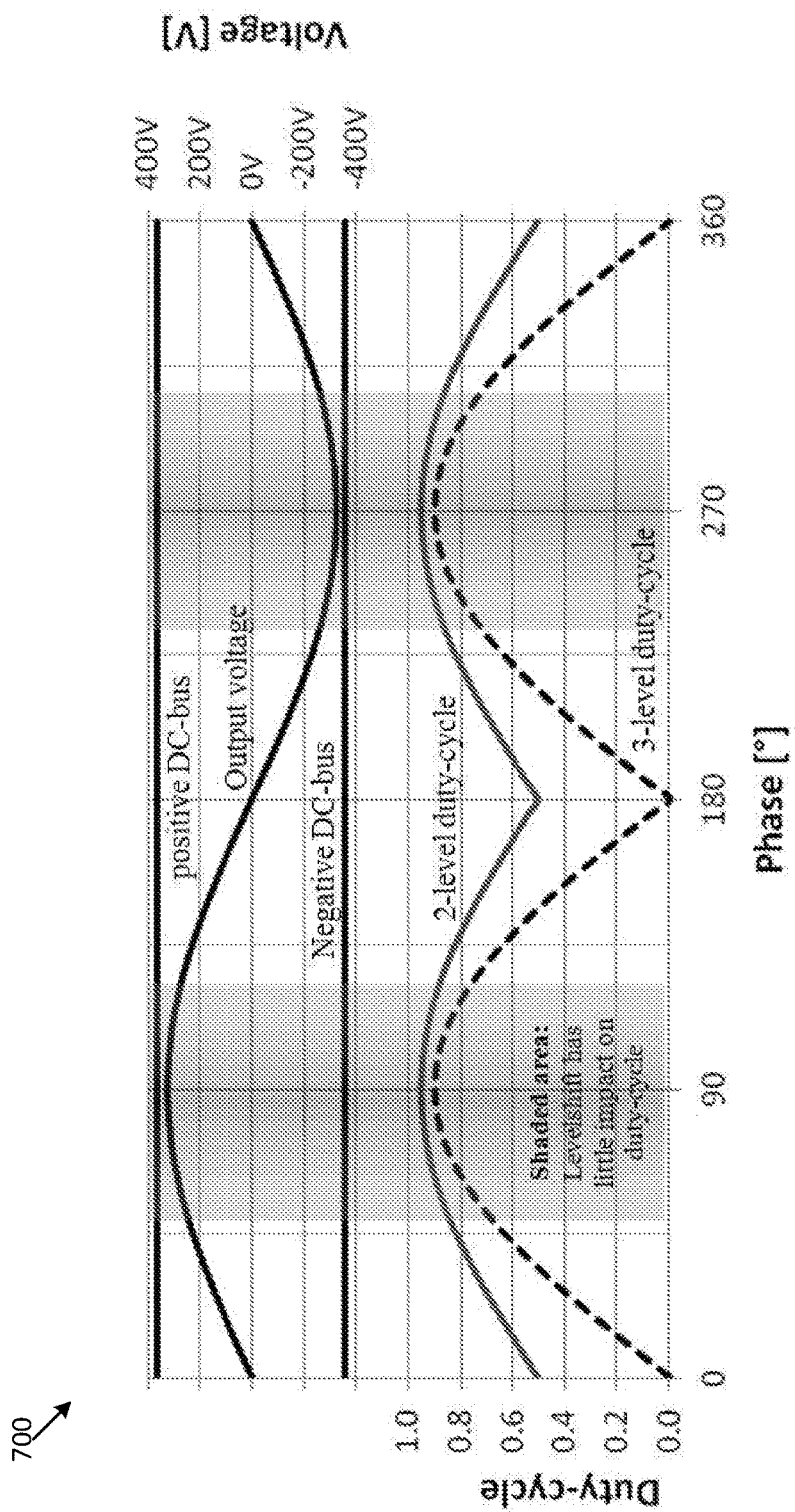
FIG. 7 includes a graph illustrating operation of an inverter according to aspects described herein.

Another benefit of utilizing the control scheme illustrated in FIG. 5 is that the shift between 2-level and 3-level operation is relatively simple to implement around the top-point of a half period since the inverter 112 is typically operating in Continuous Conduction Mode (CCM) and the required step of the inverter duty cycle is relatively small. For example, FIG. 7 includes a graph 700 illustrating operation of the inverter 112 in 2-level and 3-level operation. As shown in the graph 700, shifting between 2-level and 3-level operation, when the 2-level operation is centered around the top-point of a half period, has relatively little impact on the duty cycle of the inverter 112. More specifically, as shown in FIG. 7, the inverter duty cycles during 2-level operation and 3-level operation are almost identical around the line-cycle top point. As such, in such a configuration, the inverter regulation loop may not be required to drastically alter the duty cycle when the inverter is switched between 2-level and 3-level operation.

Figure 8:
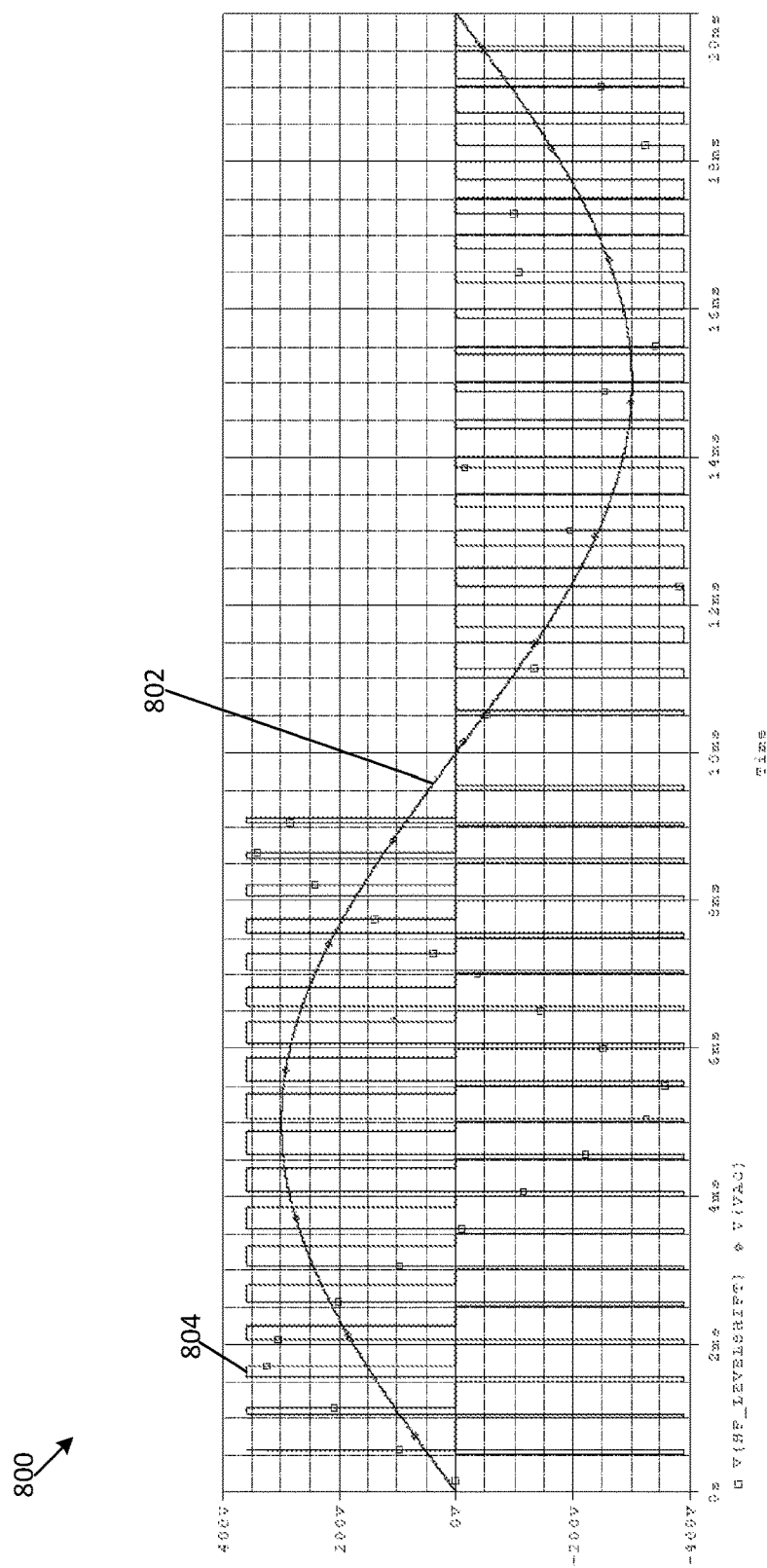
FIG. 8 is a graph illustrating another control scheme of an inverter according to aspects described herein.

FIG. 8 is a graph 800 illustrating another control scheme of the inverter 112 according to at least one embodiment. The graph 800 includes a first trace 802 illustrating an output AC voltage waveform (VAC) of the inverter 112, and a second trace 804 illustrating a high-frequency PWM voltage of the inverter 112. During the control scheme illustrated in FIG. 8, the controller 116 operates the inverter 112 to operate as partly in 3-level and 2-level operation during each high-frequency PWM switching cycle 804 in one half period. For example, as shown in the control scheme 800 of FIG. 8, the inverter 112 operates as a combined 2-level/3-level inverter in the positive half-period from 0 ms to 10 ms. By adjusting the time operating as a 3-level inverter vs the time operating as a 2-level inverter in each switch cycle 804, more or less energy can be transferred from the positive DC bus 106 to the negative DC bus 110.

The control scheme illustrated in FIG. 8 may have several drawbacks as compared to the control scheme discussed above with respect to FIG. 5. For example, the control scheme illustrated in FIG. 8 may result in increased switching losses as the inverter PWM voltage has to shift level twice as many times, even if only a small amount of energy transfer is needed. In addition, ripple current (and hence, core losses) in the inverter 112 may increase noticeably as more energy is transferred between busses.

According to another control scheme of the inverter 112, the inverter 112 is operated purely as a 2-level inverter for an entire half period (e.g., 50 Hz half period) of an AC line cycle. For example, if only a small amount of energy has to be transferred between the DC busses 106, 110 to balance the busses, one out of every 100 half-cycles can be operated with 2-level operation and the remaining ninety-nine cycles out of every 100 half-cycles would be operated in 3-level operation. If more power needs to be transferred, the inverter 112 can be operated in 2-level operation more often. When compared to the control scheme of FIG. 8, this method considerably reduces switching losses as 2-level operation is typically only implemented in a small fraction of half-periods. However, in the limited number of 2-level half periods, the inductor ripple current can become very high, especially around an output voltage of 0V. This may impact ripple on the output 114a-c and may even affect inverter stability.

In addition, by operating the inverter 112 as purely as a 2-level inverter for a limited number of half periods, it may be difficult to make a successful level shift between the 2-level and the 3-level operation, as the shift has to be made close to the line-cycle zero-crossing, voltage is typically tracked poorly in 3-level operation, and the inverter 112 might be operating in Discontinuous Conduction Mode (DCM). Finally, as a limited number of half periods (e.g., 1 out of 100) are operated in 2-level operation, the regulation speed/bandwidth will be very low (e.g., <1 Hz).

To properly switch between 2-level and 3-level operation, the duty cycle of the inverter 112 must be carefully controlled to maintain a smooth transition. For example, if the inverter 112 is operated (in 2-level operation) to transfer energy from the positive DC bus 106 to the negative DC bus 110 such that current free wheels through the negative DC bus 110 and the diode of the second switch (Q2) 204 for at least a part of a positive half-period (e.g., as shown in the third mode of operation of FIG. 4), when the inverter 112 is operated in 3-level operation (e.g., as shown in the first mode of operation of FIG. 2), the duty cycle of the first switch Q1 (202) must be increased to account for the reduction in output current due to the 2-level operation. By proper calculation, the inverter 112 duty cycle can be stepped up to compensate for the shift between 2-level and 3-level operation. Duty cycle calculation for 3-level vs. 2-level operation (assuming the same voltage on the positive DC bus 106 and the negative DC bus 110) is discussed below.

A standard buck converter duty cycle (e.g., 3-level operation) is represented by:

$$D_{3level}=V_{out}/V_{DCbus}$$

A standard buck converter duty cycle with negative DC-bus "offset" (e.g., 2-level operation) is represented by:

$$D_{2level}=(V_{out}+V_{DCbus})/(2*V_{DCbus})$$

Solving for Vout in both equations above results in:

$$D_{3level}=V_{out}/V_{DCbus} \rightarrow V_{out}=V_{DCbus}*D_{3level}$$

$$D_{2level}=(V_{out}+V_{DCbus})/(2*V_{DCbus}) \rightarrow V_{out}=D_{2level}*2*V_{DCbus}-V_{DCbus}$$

$V_{out}$ must be identical for 2-level and 3-level operation in order to make a smooth level-shift. Accordingly:

$$V_{out,3level}=V_{out,2\ level} \rightarrow V_{DCbus}*D_{3level}=D_{2level}*2*V_{DCbus}-V_{DCbus}$$

Solving for $D_{2level}$:

$$D_{2level}=(D_{3level}*V_{DCbus}+V_{DCbus})/(2*V_{DCbus})=(D_{3level}+1)/2$$

As shown above, the resulting expression for the 2-level duty cycle ($D_{2level}$) is a relatively simple expression that is a function of the 3-level duty cycle ($D_{3level}$). The resulting expression is important for a smooth transition during a level shift as it can be used to "step" the inverter duty cycle instantaneously at the moment when a level shift is requested. For example, if the inverter 112 is operating in 3-level operation and the controller 116 requests a shift to 2-level operation, the controller 116 can simply adjust the duty cycle of the inverter 112 based on the above expression, and vice versa. By operating based on the expression above, the inverter regulation loop may not notice any change due to level shift.

The amount of transferred power at any point during 2-level operation can be expressed as:

$$P=I_{out}*(1-D_{2level})*V_{DCbus}$$

Figure 9:
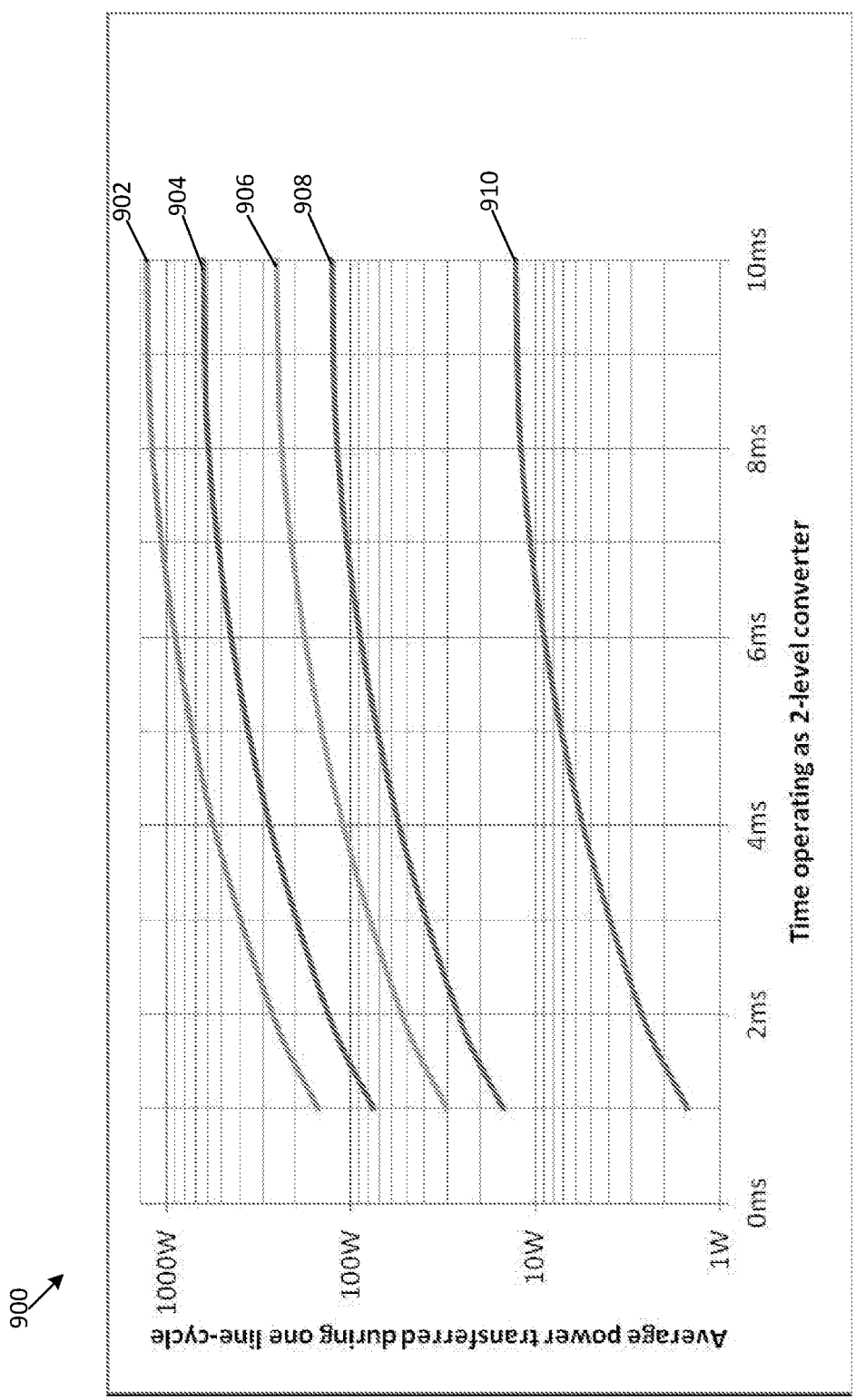
FIG. 9 includes a graph representing average power transferred by an inverter according to aspects described herein.

This expression suggests that available energy transfer potential depends on the output current of the inverter 112 and hence the load of the inverter 112. The formula may be used for calculation during a full line-cycle of transferred power vs. load. Example results can be found in FIG. 9. FIG. 9 includes a graph 900 representing the average power transferred during one full 50 Hz line cycle vs. the time the inverter 112 is operated as a 2-level inverter. The graph 900 includes a first trace 902 representing average power transferred for a 10 kW inverter load, a second trace 904 representing average power transferred to a 5 kW inverter load vs. the 2-level operation time, a third trace 906 representing average power transferred to a 2 kW inverter load vs. the 2-level operation time, a fourth trace 908 representing average power transferred to a 1 kW inverter load vs. the 2-level operation time, and a fifth trace 910 representing average power transferred to a 100 W inverter load vs. the 2-level operation time.

As shown in FIG. 9, it is possible to transfer roughly 10% of the total output load if operating the inverter 112 as a 2-level inverter for 6 ms (60% of available time). This is typically the amount of power that a conventional dedicated bus balancer would be designed to move. Hence, through operation of the inverter 112 as discussed above, the inverter 112 is able to move at least the same amount of energy as a conventional dedicated circuit, albeit without requiring a dedicated bus balancer circuit. In addition, since transferable energy is dependent on output power, only a certain percentage (~10%) of the total output load must be half-wave rectified load. This generally will not be an issue since such load types are generally not utilized.

Figure 10:
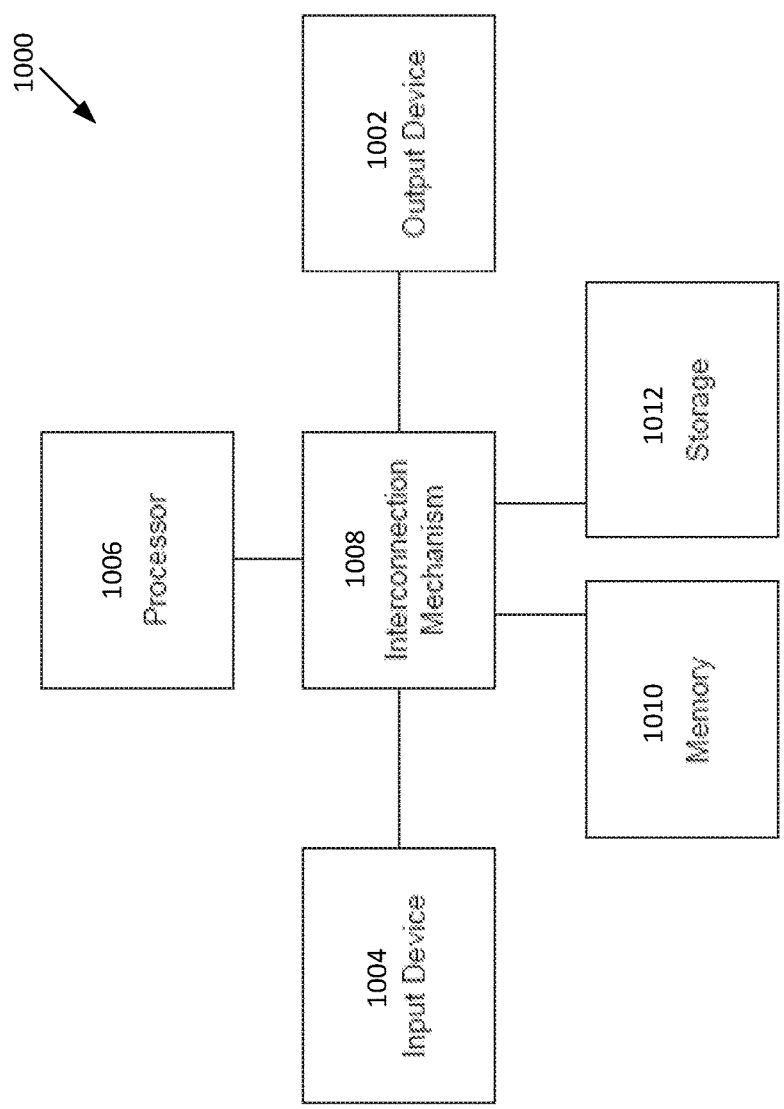
FIG. 10 is a block diagram of a system upon which various embodiments of the invention may be implemented.

FIG. 10 illustrates an example block diagram of computing components forming a system 1000 which may be configured to implement one or more aspects disclosed herein. For example, the system 1000 may be communicatively coupled to the controller 116 or included within the controller 116. The system 1000 may also be configured to operate a UPS as discussed above.

The system 1000 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 1000 may include specially-programmed, special-purpose hardware, for example, an application-specific integrated circuit (ASIC). Various aspects of the present disclosure may be implemented as specialized software executing on the system 1000 such as that shown in FIG. 10.

The system 1000 may include a processor/ASIC 1006 connected to one or more memory devices 1010, such as a disk drive, memory, flash memory or other device for storing data. Memory 1010 may be used for storing programs and data during operation of the system 1000. Components of the computer system 1000 may be coupled by an interconnection mechanism 1008, which may include one or more buses (e.g., between components that are integrated within a same machine) and/or a network (e.g., between components that reside on separate machines). The interconnection mechanism 1008 enables communications (e.g., data, instructions) to be exchanged between components of the system 1000. The system 1000 also includes one or more input devices 1004, which may include for example, a keyboard or a touch screen. The system 1000 includes one or more output devices 1002, which may include for example a display. In addition, the computer system 1000 may contain one or more interfaces (not shown) that may connect the computer system 1000 to a communication network, in addition or as an alternative to the interconnection mechanism 1008.

The system 1000 may include a storage system 1012, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 1010 that allows for faster access to the information by the processor/ASIC than does the medium. This memory 1010 may be a volatile, random access memory such as a dynamic random access memory (DRAM) or static memory (SRAM). It may be located in storage system 1012 or in memory system 1010. The processor 1006 may manipulate the data within the integrated circuit memory 1010 and then copy the data to the storage 1012 after processing is completed. A variety of mechanisms are known for managing data movement between storage 1012 and the integrated circuit memory element 1010, and the disclosure is not limited thereto. The disclosure is not limited to a particular memory system 1010 or a storage system 1012.

The system 1000 may include a computer platform that is programmable using a high-level computer programming language. The system 1000 may be also implemented using specially programmed, special purpose hardware, e.g. an ASIC. The system 1000 may include a processor 1006, which may be a commercially available processor such as the well-known Pentium class processor available from the Intel Corporation. Many other processors are available. The processor 1006 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

As described above, the level shift inverter operation approach is utilized with an NPC-2 topology; however, in other embodiments, the approach can be utilized with other 3-level topologies such as the NPC-1 topology. The approach may also be utilized in some bi-directional PFC front end converters. In such an approach, the bi-directional PFC front end converter can similarly be configured to operate in a 2-level mode of operation during at least a part of a high-frequency inverter switching cycle in one half-period of an AC line cycle to transfer energy between DC busses.

As also described above, the level shift inverter operation is utilized with a UPS coupled to a three-phase power source; however, in other embodiments, the level shift inverter operation may be utilized in a UPS coupled to another type of power (e.g., single phase or split-phase power).

As described above, the level shift inverter operation is utilized with a UPS that received AC power from an AC power source; however, in other embodiments, the level shift inverter operation described above is utilized with a UPS that receives DC power from a DC power source.

As discussed above, a UPS system is provided that utilizes its inverter as a DC bus balancer, thus saving the additional cost and footprint typically required by a dedicated bus balancer circuit. The UPS system operates by controlling the 3-level inverter to operate as a 2-level inverter during at least a part of a high-frequency inverter switching cycle in one half-period of an AC line cycle.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) system, the UPS system comprising:

an input configured to be coupled to an AC source and to receive input AC power from the AC source;

an output configured to provide output AC power to a load;

a converter coupled to the input and configured to convert the input power into DC power having a positive DC voltage level and a negative DC voltage level;

a plurality of DC busses coupled to the converter and configured to receive the DC power from the converter, the plurality of DC busses including a positive DC bus configured to maintain the positive DC voltage level, a mid-point DC bus, and a negative DC bus configured to maintain the negative DC voltage level;

a 3-level inverter coupled to the plurality of DC busses and configured to convert the DC power from the plurality of DC busses into the output AC power and provide the output AC power to the output; and a controller configured to monitor the positive DC voltage level and the negative DC voltage level, identify an imbalance between the positive DC voltage level and the negative DC voltage level, and selectively control, based on the imbalance, the 3-level inverter to operate in a 2-level mode of operation and a 3-level mode of operation to transfer energy between the positive DC bus and the negative DC bus, wherein in operating the 3-level inverter in the 2-level mode of operation, the controller is further configured to operate the 3-level inverter to alternately couple the output to the positive DC bus and the negative DC bus to alternately provide a positive DC pulse and a negative DC pulse, respectively, to the output, wherein in operating the 3-level inverter in the 3-level mode of operation, the controller is further configured to operate the 3-level inverter to alternately couple the output to the mid-point DC bus and one of the positive DC bus and the negative DC bus, wherein in operating the 3-level inverter in the 2-level mode of operation, the controller is further configured to operate the 3-level inverter to provide multiple successive transitions between the positive and negative DC pulses, and wherein in selectively controlling the 3-level inverter to operate in the 2-level mode of operation and the 3-level mode of operation, the controller is further configured to operate the 3-level inverter in the 2-level mode of operation during a half-period of a line cycle of the output AC power, and operate the 3-level inverter in the 3-level mode of operation during a remainder of the line cycle of the output AC power.

2. The UPS system of claim 1, wherein the 3-level inverter is based on an NPC-2 topology.

3. The UPS system of claim 1, wherein in selectively controlling the 3-level inverter to operate in the 2-level mode of operation and the 3-level mode of operation, the controller is further configured to operate the 3-level inverter, during a positive half-period of the line cycle, in the 2-level mode of operation to transfer energy from the positive DC bus to the negative DC bus.

4. The UPS system of claim 3, wherein in operating the 3-level inverter, during the positive half-period of the line cycle, in the 2-level mode of operation to transfer energy from the positive DC bus to the negative DC bus, the controller is further configured to operate the 3-level inverter in the 2-level mode of operation for a portion of the positive half-period.

5. The UPS system of claim 3, wherein in operating the 3-level inverter, during the positive half-period of the line cycle, in the 2-level mode of operation to transfer energy from the positive DC bus to the negative DC bus, the controller is further configured to operate the 3-level inverter to alternate between the 2-level mode of operation and the 3-level mode of operation during the positive half-period.

6. The UPS system of claim 3, wherein in operating the 3-level inverter, during the positive half-period of the line cycle, in the 2-level mode of operation to transfer energy from the positive DC bus to the negative DC bus, the controller is further configured to operate the 3-level inverter in the 2-level mode of operation for the entire positive half-period.

7. The UPS system of claim 3, wherein in selectively controlling the 3-level inverter to operate in the 2-level mode of operation and the 3-level mode of operation, the controller is further configured to operate the 3-level inverter, during a negative half-period of the line cycle, in the 2-level mode of operation to transfer energy from the negative DC bus to the positive DC bus.

8. The UPS system of claim 1, wherein the 3-level inverter comprises a plurality of switches coupled between the plurality of DC busses, and wherein in selectively controlling the 3-level inverter to operate in the 2-level mode of operation and the 3-level mode of operation, the controller is further configured to control the plurality of switches to:
 operate, in a first mode of operation, to generate a first current path that draws energy from the positive DC bus and boosts current through the output;
 operate, in a second mode of operation, to generate a second current path between the mid-point DC bus and the output; and
 operate, in a third mode of operation, to generate a third current path that delivers energy to the negative DC bus.

9. The UPS system of claim 8, wherein the plurality of switches includes:
 a first switch coupled between the positive DC bus and the output;
 a second switch coupled between the negative DC bus and the output;
 a third switch coupled to the mid-point DC bus; and
 a fourth switch coupled between the third switch and the output.

10. The UPS system of claim 9, wherein in operating the plurality of switches in the first mode of operation, the controller is further configured to control the first switch to close to couple the positive DC bus to the output via the first switch.

11. The UPS system of claim 10, further comprising a first capacitor coupled between the mid-point bus and the positive DC bus.

12. The UPS system of claim 10, wherein in operating the plurality of switches in the second mode of operation, the controller is further configured to control the third switch and the fourth switch to close to couple the mid-point DC bus to the output via the third switch and the fourth switch.

13. The UPS system of claim 12, wherein in operating the plurality of switches in the third mode of operation, the controller is further configured to control the second switch to couple the negative DC bus to the output via the second switch.

14. The UPS system of claim 13, further comprising a second capacitor coupled between the mid-point bus and the negative DC bus.

15. The UPS system of claim 1, wherein the converter is further configured to receive 3-phase input AC power from the AC source and convert the 3-phase input AC power into the DC power.

16. The UPS system of claim 15, wherein the 3-level inverter is further configured to convert the DC power from the plurality of DC busses into 3-phase output AC power and provide the 3-phase output AC power to the output.

17. A method for operating an Uninterruptible Power Supply (UPS) comprising an input configured to be coupled to a power source, an output, a plurality of DC busses including a positive DC bus, a mid-point DC bus, and a negative DC bus, and a 3-level inverter coupled to the plurality of DC busses, the method comprising:
 receiving input power from the power source;
 maintaining a positive DC voltage level on the positive DC bus;
 maintaining a negative DC voltage level on the negative DC bus;
 converting, with the 3-level inverter, the DC power from the plurality of DC busses into output AC power;

providing the output AC power to the output;
monitoring the positive DC voltage level and the negative DC voltage level;
identifying an imbalance between the positive DC voltage level and the negative DC voltage level; and
selectively controlling, based on the imbalance, the 3-level inverter to operate in a 2-level mode of operation and a 3-level mode of operation to transfer energy between the positive DC bus and the negative DC bus, wherein operating the 3-level inverter in the 2-level mode of operation includes operating the 3-level inverter to alternately couple the output to the positive DC bus and the negative DC bus to alternately provide a positive DC pulse and a negative DC pulse, respectively, to the output,
wherein operating the 3-level inverter in the 3-level mode of operation includes operating the 3-level inverter to alternately couple the output to the mid-point DC bus and one of the positive DC bus and the negative DC bus,
wherein operating the 3-level inverter in the 2-level mode of operation includes operating the 3-level inverter to provide multiple successive transitions between the positive and negative DC pulses, and
wherein selectively controlling the 3-level inverter to operate in the 2-level mode of operation and the 3-level mode of operation includes operating the 3-level inverter in the 2-level mode of operation during a half-period of a line cycle of the output AC power, and operating the 3-level inverter in the 3-level mode of operation during a remainder of the line cycle of the output AC power.

18. The method of claim 17, wherein selectively controlling the 3-level inverter to operate in the 2-level mode of operation and the 3-level mode of operation includes:
operating the 3-level inverter, during a positive half-period of the line cycle, in the 2-level mode of operation to transfer energy from the positive DC bus to the negative DC bus; and
operating the 3-level inverter, during a negative half-period of the line cycle, in the 2-level mode of operation to transfer energy from the negative DC bus to the positive DC bus.

19. The method of claim 18, wherein the UPS further comprises a plurality of switches coupled between the DC busses, and wherein operating the 3-level inverter, during the positive half-period of the line cycle, in the 2-level mode of operation to transfer energy from the positive DC bus to the negative DC bus includes:
operating, in a first mode of operation, the plurality of switches to boost output current of the 3-level inverter;
operating, in a second mode of operation, the plurality of switches to free-wheel current in the mid-point DC bus; and
operating, in a third mode of operation, the plurality of switches to free-wheel current in the negative DC bus, transferring energy from the positive DC bus to the negative DC bus.

20. An Uninterruptible Power Supply (UPS) system, the UPS system comprising:
an input configured to be coupled to a power source and to receive input power from the power source;
an output configured to provide output AC power to a load;
a converter coupled to the input and configured to convert the input power into DC power having a positive DC voltage level and a negative DC voltage level;
a plurality of DC busses coupled to the converter and configured to receive the DC power from the converter, the plurality of DC busses including a positive DC bus configured to maintain the positive DC voltage level, a mid-point DC bus, and a negative DC bus configured to maintain the negative DC voltage level;
a 3-level inverter coupled to the plurality of DC busses and configured to convert the DC power from the plurality of DC busses into the output AC power and provide the output AC power to the output; and
means for selectively controlling the 3-level inverter, the means for selectively controlling being configured to monitor the positive DC voltage level and the negative DC voltage level, identify an imbalance between the positive DC voltage level and the negative DC voltage level, and selectively control the 3-level inverter to operate in a 2-level mode of operation and a 3-level mode of operation to balance the positive DC voltage level on the positive DC bus with the negative DC voltage level on the negative DC bus,
wherein in operating the 3-level inverter in the 2-level mode of operation, the means for selectively controlling is further configured to operate the 3-level inverter to alternately couple the output to the positive DC bus and the negative DC bus to alternately provide a positive DC pulse and a negative DC pulse, respectively, to the output,
wherein in operating the 3-level inverter in the 3-level mode of operation, the means for selectively controlling is further configured to operate the 3-level inverter to alternately couple the output to the mid-point DC bus and one of the positive DC bus and the negative DC bus,
wherein in operating the 3-level inverter in the 2-level mode of operation, the means for selectively controlling is further configured to operate the 3-level inverter to provide multiple successive transitions between the positive and negative DC pulses, and
wherein in selectively controlling the 3-level inverter, the means for selectively controlling is further configured to control the 3-level inverter to operate in the 2-level mode of operation during a half-period of a line cycle of the output AC power, and operate the 3-level inverter in the 3-level mode of operation during a remainder of the line cycle of the output AC power.

* * * * *